(12) United States Patent
Fei et al.

(10) Patent No.: US 12,473,166 B2
(45) Date of Patent: Nov. 18, 2025

(54) MOBILE REEL TRANSPORT DEVICE FOR COMPONENT REEL PACKAGING SYSTEM

(71) Applicants: TE Connectivity Solutions GmbH, Schaffhausen (CH); Tyco Electronics (Shanghai) Co., Ltd., Shanghai (CN)

(72) Inventors: Yiyun Fei, Middletown, PA (US); Swapnilsinh Solanki, Harrisburg, PA (US); Du Wen, Reading, PA (US); Sonny O. Osunkwo, Harrisburg, PA (US); An Yang, Shanghai (CN)

(73) Assignees: TE Connectivity Solutions GmbH (CH); Tyco Electronics (Shanghai) Co., Ltd (CN)

( * ) Notice: Subject to any disclaimer, the term of this patent is extended or adjusted under 35 U.S.C. 154(b) by 576 days.

(21) Appl. No.: 17/724,742

(22) Filed: Apr. 20, 2022

(65) Prior Publication Data

US 2023/0303354 A1    Sep. 28, 2023

(51) Int. Cl.
*B25J 9/16* (2006.01)
*B65H 19/12* (2006.01)

(52) U.S. Cl.
CPC .............. *B65H 19/12* (2013.01); *B25J 9/162* (2013.01); *B25J 9/1687* (2013.01); *B25J 9/1697* (2013.01); *B65H 2405/422* (2013.01); *B65H 2801/81* (2013.01)

(58) Field of Classification Search
CPC .............. B65H 19/12; B65H 2405/422; B65H 2801/81; B25J 9/162; B25J 9/1687; B25J 9/1697
See application file for complete search history.

(56) References Cited

U.S. PATENT DOCUMENTS

| | | | |
|---|---|---|---|
| 2018/0141772 A1* | 5/2018 | Prankl | B65H 19/12 |
| 2021/0139264 A1* | 5/2021 | Badini | B65H 19/123 |
| 2024/0149320 A1* | 5/2024 | Kutschar | B65H 19/12 |

* cited by examiner

*Primary Examiner* — Jason Holloway

(57) ABSTRACT

A mobile reel transport device includes an automated guided vehicle (AGV) having a mobile cart with wheels for maneuvering through a facility. The AGV includes a reel manipulator mounted to the mobile cart. The reel manipulator has a movable component movable relative to the mobile cart and an end effector at a distal end of the movable component. The end effector is configured to pick up and manipulate a reel. The AGV includes a reel positioning device at the distal end of the movable component. The reel positioning device includes an imaging device for imaging the reel and environment and generating an image. The reel manipulator is operable to move the end effector based on the image.

20 Claims, 6 Drawing Sheets

MOBILE REEL TRANSPORT DEVICE FOR COMPONENT REEL PACKAGING SYSTEM

CROSS REFERENCE TO RELATED APPLICATIONS

This application claims benefit to Chinese Application No. 202210298405.2, filed 24 Mar. 2022, the subject matter of which is herein incorporated by reference in its entirety.

BACKGROUND OF THE INVENTION

The subject matter herein relates generally to component reel packaging systems.

Cardboard reels are used commonly in manufacturing lines to store raw materials and finished goods. Transporting a reel is a necessary and frequent task in many strip products manufacturing processes, such as packaging and stamping. Currently most of the tasks are done by human, which requires much labor and have safety concerns.

A need remains for adaptive, automated material handling for component reel packaging systems.

BRIEF DESCRIPTION OF THE INVENTION

In one embodiment, a mobile reel transport device is provided and includes an automated guided vehicle (AGV) having a mobile cart with wheels for maneuvering through a facility. The AGV includes a reel manipulator mounted to the mobile cart. The reel manipulator has a movable component movable relative to the mobile cart and an end effector at a distal end of the movable component. The end effector is configured to pick up and manipulate a reel. The AGV includes a reel positioning device at the distal end of the movable component. The reel positioning device includes an imaging device for imaging the reel and environment and generating an image. The reel manipulator is operable to move the end effector based on the image.

In another embodiment, a component reel packaging system for loading components on reels is provided. The component reel packaging system includes a reel loading workstation having a reel support. The component reel packaging system includes a mobile reel transport device movable relative to the reel loading workstation. The mobile reel transport device includes an automated guided vehicle (AGV) having a mobile cart with wheels for maneuvering the mobile reel transport device relative to the reel loading workstation. The mobile reel transport device includes a reel manipulator mounted to the mobile cart has a movable component movable relative to the mobile cart and an end effector at a distal end of the movable component configured to pick up and manipulate a reel. The mobile reel transport device includes a reel positioning device at the distal end of the movable component has an imaging device for imaging the reel and environment and generating an image. The reel manipulator being operable to move the end effector based on the image. The reel positioning device is configured to pick up an empty reel and place the empty reel on the reel support. The empty reel is configured to be loaded with components at the reel loading workstation. The reel positioning device is configured to pick up the full reel loaded with components and move the full reel away from the reel support.

In a further embodiment, a component reel packaging system for loading components on reels is provided. The component reel packaging system includes an empty reel rack configured to hold an empty reel stack of empty reels. The component reel packaging system includes a full reel rack configured to hold a full reel stack of full reels. The component reel packaging system includes a reel loading workstation near the empty reel rack and the full reel rack. The reel loading workstation has a reel support configured to support a reel for loading components on the reel. The component reel packaging system includes a mobile reel transport device movable relative to the empty reel rack, the full reel rack, and the reel loading workstation. The mobile reel transport device includes an automated guided vehicle (AGV) having a mobile cart with wheels for maneuvering the mobile reel transport device. The mobile reel transport device includes a reel manipulator mounted to the mobile cart has a movable component movable relative to the mobile cart and an end effector at a distal end of the movable component configured to pick up and manipulate a reel, and the mobile reel transport device includes a reel positioning device at the distal end of the movable component has an imaging device for imaging the reel and environment and generating an image. The reel manipulator is operable to move the end effector based on the image. The reel positioning device is configured to pick up an empty reel from the empty reel stack at the empty reel rack and place the empty reel on the reel support. The empty reel is configured to be loaded with components at the reel loading workstation. The reel positioning device is configured to pick up the full reel loaded with components and move the full reel from the reel support to the full reel stack at the full reel rack.

DETAILED DESCRIPTION OF THE INVENTION

Figure 1:
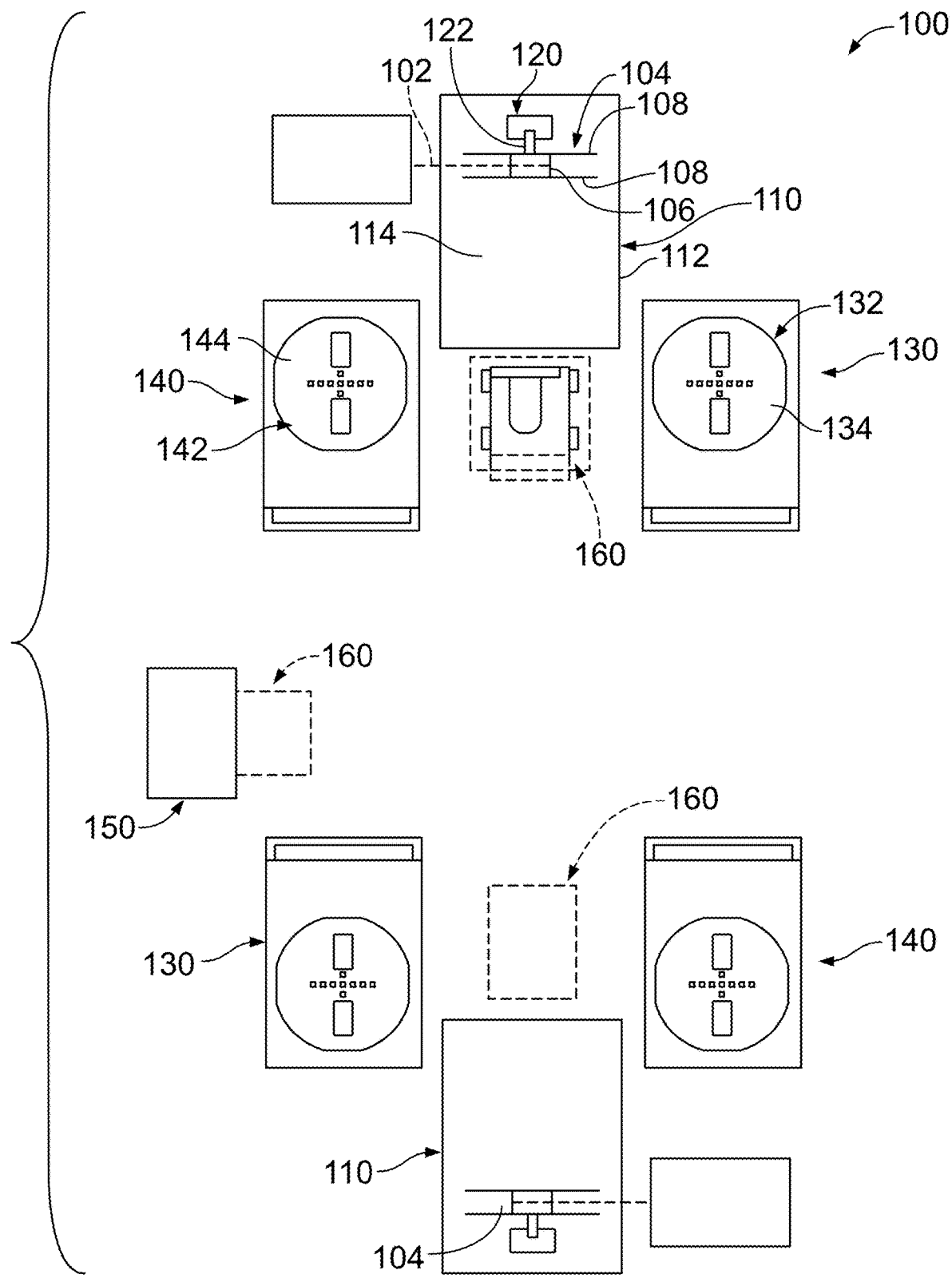
FIG. 1 is a component reel packaging system in accordance with an exemplary embodiment.

FIG. 1 is a component reel packaging system 100 in accordance with an exemplary embodiment. The component reel packaging system 100 is used for packaging components 102 onto reels 104. For example, the components 102 may be electrical contacts held together on a strip. The component reel packaging system 100 provides automated material handling, such as without human intervention. In an exemplary embodiment, the component reel packaging system 100 uses vision guidance to automate the material handling and facilitate packaging the components 102 onto the reels 104.

In an exemplary embodiment, the reel 104 is a roller or spool manufactured from cardboard pieces. The reel 104 includes a hub 106 and a pair of side walls 108 coupled to opposite sides of the hub 106. The side walls 108 form a space radially outward of the hub 106 between the side walls 108 that receives the components 102. The components 102 may be wound onto the hub 106 in the space between the side walls 108.

The component reel packaging system 100 includes one or more reel loading workstations 110. The components 102 are loaded onto the reels 104 at the reel loading workstations 110. In the illustrated embodiment, two of the reel loading workstations 110 are shown. However, greater or fewer reel loading workstations 110 may be provided within the manufacturing facility. In an exemplary embodiment, a parking spot 160 is located immediately in front of each reel loading workstation 110. The parking spot 160 is at a predetermined position relative to the reel loading workstation 110 (for example, a predetermined distance from a datum of the reel loading workstation 110).

The component reel packaging system 100 includes a mobile reel transport device 200 movable between the reel loading workstations 110 and capable of handling the reels 104. For example, the mobile reel transport device 200 may pick up empty reels 104 and load the empty reels onto the reel loading workstation 110 and may pick up the loaded reels 104 from the reel loading workstation 110 and drop off the full reels at a packaging location. The mobile reel transport device 200 is movable to the parking spot 160 to position the mobile reel transport device 200 at a predetermined position relative to the reel loading workstation 110 for loading and unloading the reels 104 to and from the reel loading workstation 110.

In an exemplary embodiment, the component reel packaging system 100 includes a docking station 150 within the facility remote from the reel loading workstation 110. The docking station 150 is used for charging the mobile reel transport device 200. The mobile reel transport device 200 may move between the docking station 150 and the reel loading workstations 110 from time to time. The component reel packaging system 100 may include other types of workstations in alternative embodiments, such as component or material packing or unpacking stations, reel packing or unpacking stations, or other types of workstations. The mobile reel transport device 200 may be movable to the various workstations to perform tasks at the workstations.

In an exemplary embodiment, the reel loading workstation 110 includes a frame 112 having a support surface 114. Optionally, the support surface 114 may be located at a top of the frame 112. The frame 112 may be enclosed, such as forming a cabinet. The reel loading workstation 110 includes a reel support 120 at the support surface 114. The reel support 120 may be located above the support surface 114. The reel support 120 includes a shaft 122 configured to receive the reel 104. The reel 104 is rotatable on the shaft 122.

In an exemplary embodiment, an empty reel rack 130 is provided near the reel loading workstation 110. The empty reel rack 130 holds an empty reel stack 132 of empty reels 134 (for example, reels that do not include the components 102 wound thereon). Any number of empty reels 134 may be provided in the empty reel stack 132. In various embodiments, the empty reel rack 130 is a cart movable within the facility. For example, the empty reel rack 130 may be removed when all of the empty reels 134 are removed from the empty reel rack 130 and replaced with another empty reel rack 130 having the stack 132 of empty reels 134. In other various embodiments, the empty reel rack 130 may be removed and replaced with an empty reel rack 130 having a different type of empty reels 134, such as different sized empty reels 134. In various embodiments, the empty reel rack 130 is located adjacent the reel loading workstation 110 such that the mobile reel transport device 200 may access the empty reel rack 130 and the reel loading workstation 110 from the parking spot 160 without moving from the parking spot 160. However, in alternative embodiments, the empty reel rack 130 may be located remote from the reel loading workstation 110 and the mobile reel transport device 200 may carry the empty reels 134 from the empty reel rack 130 to the reel loading workstation(s) 110.

In an exemplary embodiment, a full reel rack 140 is provided near the reel loading workstation 110. The full reel rack 140 holds a full reel stack 142 of full reels 144 (for example, reels having the components 102 wound thereon). Any number of full reels 144 may be provided in the full reel stack 142. In various embodiments, the full reel rack 140 is a cart movable within the facility. For example, the full reel rack 140 may be removed when a certain number of the full reels 144 are placed on the full reel stack 142 and replaced by another full reel rack 140 that may receive additional full reels 144. In other various embodiments, the full reel rack 140 may be removed and replaced with another full reel rack 140 that receives a different type of full reels 144, such as different sized full reels 144. In various embodiments, the full reel rack 140 is located adjacent the reel loading workstation 110 such that the mobile reel transport device 200 may access the full reel rack 140 and the reel loading workstation 110 from the parking spot 160 without moving from the parking spot 160. However, in alternative embodiments, the full reel rack 140 may be located remote from the reel loading workstation 110 and the mobile reel transport device 200 may carry the full reels 144 from the reel loading workstation(s) 110 to the full reel rack 140.

Figure 2:
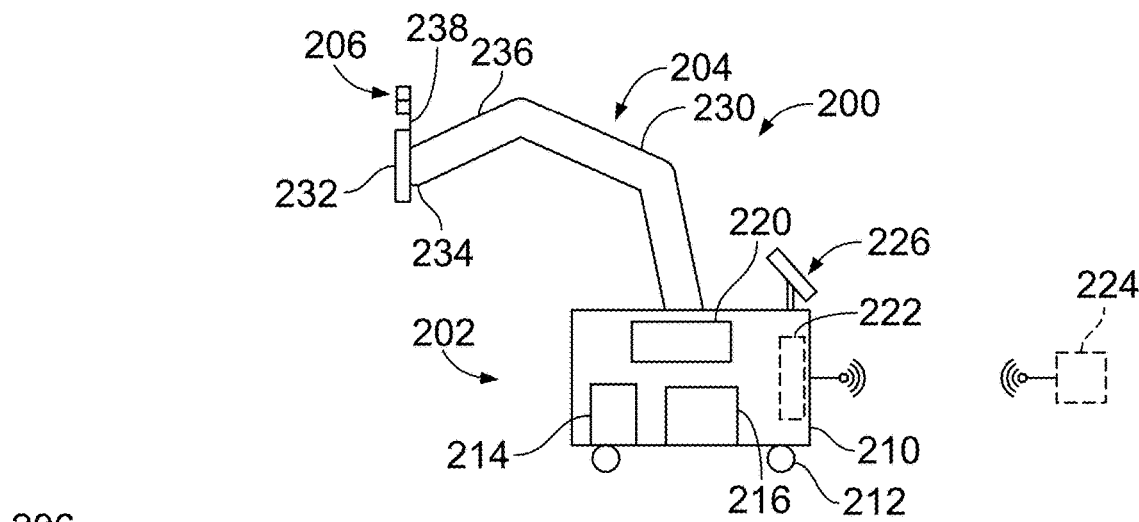
FIG. 2 illustrates the mobile reel transport device in accordance with an exemplary embodiment.

FIG. 2 illustrates the mobile reel transport device 200 in accordance with an exemplary embodiment. The mobile reel transport device 200 includes an automated guided vehicle (AGV) 202, a reel manipulator 204 mounted to the AGV 202, and a reel positioning device 206 mounted to the reel manipulator 204.

The AGV 202 includes a mobile cart 210 having wheels 212 for maneuvering through the facility. The AGV 202 includes a motor 214, such as an electric motor, for operating the wheels 212 and a power supply 216, such as a battery, for powering the motor 214. The AGV 202 includes a controller 220 for controlling operation of the mobile reel transport device 200. For example, the controller 220 may control operation of the motor 214 and/or may control operation of the reel manipulator 204. The controller 220 includes one or more processors for controlling operations of the various components of the mobile reel transport device 200.

In an exemplary embodiment, the AGV 202 includes a communication module 222 for wireless communication between the mobile reel transport device 200 and a call center 224. The communication module 222 receives commands and/or operation instructions for operating the mobile reel transport device 200. For example, the reel loading workstations 110 may communicate wirelessly with the mobile reel transport device 200 to demand changing of the reels 104, such as unloading of full reels from the reel loading workstation 110 and/or loading of empty reels to the reel loading workstation 110. The call center 224 may be a central call center controlling operations at various workstations. In other embodiments, the call center 224 may be a single point call center, such as associated with a particular workstation that operates independently of other workstations having other call centers. Data is communicated between the communication module 222 and the controller 220, such as to control operation of the mobile reel transport device 200 based on data received by the communication module 222.

In an exemplary embodiment, the AGV 202 includes a user interface 226. The user interface 226 is operably connected to the controller 220. The user interface 226 may include a display and/or inputs, such as buttons, to allow interaction between the operator and the AGV 202. Control of the mobile reel transport device 200 may be operated manually through the user interface 226. The status of jobs or tasks performed or in queue of the mobile reel transport device 200 may be displayed through the user interface 226.

The reel manipulator 204 is coupled to a top of the mobile cart 210. The mobile cart 210 is used to move the reel manipulator 204 throughout the facility, such as to various workstations. The reel manipulator 204 is movable relative to the AGV 202, such as to perform tasks, such as manipulation of the reels 104 at the workstations. In an exemplary embodiment, the reel manipulator 204 includes a movable component 230 and an end effector 232 at a distal end 234 of the movable component 230. The end effector 232 is configured to pick up the reels 104 or perform other tasks. In various embodiments, the end effector 232 is a vacuum gripper configured to hold the reel 104 by vacuum or suction pressure. Other types of end effectors may be used in alternative embodiments, such as mechanical grippers, clamps, and the like. The movable component 230 is capable of moving the end effector 232 relative to the mobile cart 210. A base of the movable component 230 is fixed to the mobile cart 210. The distal end 234 of the movable component 230 is movable relative to the base. For example, the movable component 230 may be configured to move the end effector 232 in three-dimensional space, such as to pick up or drop off the reels 104 at the various workstations. In various embodiments, the movable component 230 includes a multi-axis robot arm 236. The robot arm 236 is movable in three-dimensional space. In an exemplary embodiment, a bracket 238 is provided at the distal end 234. The end effector 232 is coupled to the bracket 238 and movable with the movable component 230. The reel positioning device 206 may be coupled to the bracket 238 and movable with the movable component 230.

Figure 3:
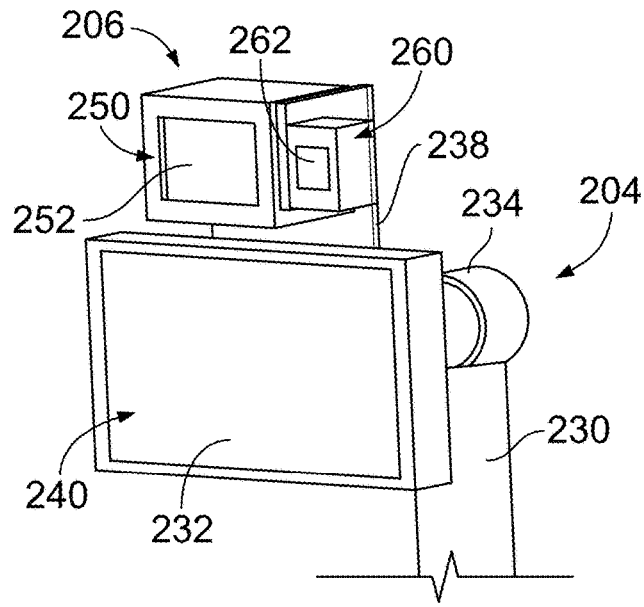
FIG. 3 is a front perspective view of a portion of the mobile reel transport device showing a portion of the reel manipulator and the reel positioning device in accordance with an exemplary embodiment.
Figure 4:
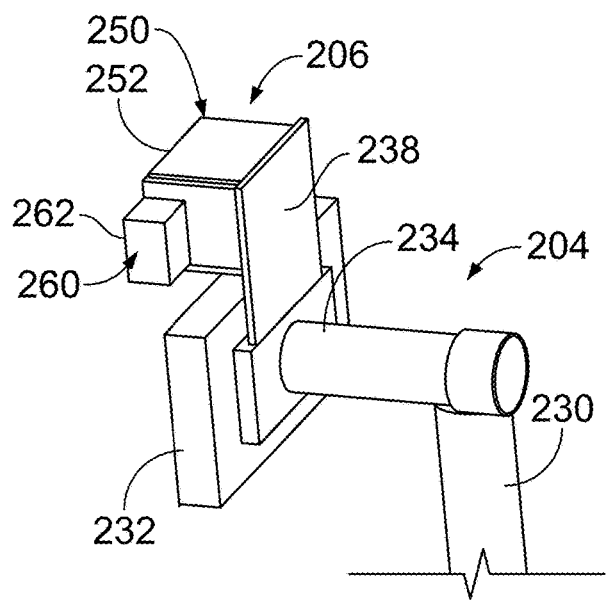
FIG. 4 is a rear perspective view of a portion of the mobile reel transport device showing a portion of the reel manipulator and the reel positioning device in accordance with an exemplary embodiment.

FIG. 3 is a front perspective view of a portion of the mobile reel transport device 200 showing a portion of the reel manipulator 204 and the reel positioning device 206. FIG. 4 is a rear perspective view of a portion of the mobile reel transport device 200 showing a portion of the reel manipulator 204 and the reel positioning device 206.

The end effector 232 and the reel positioning device 206 are coupled to the bracket 238 at the distal end 234 of the movable component 230. The end effector 232 includes a reel interface 240 configured to interface with the reel 104 to pickup and move the reel 104 at the various workstations. In an exemplary embodiment, the end effector 232 is a vacuum gripper configured to create a vacuum at the reel interface 240. For example, the reel interface 240 may be generally planar configured to interface with one of the side walls 108 of the reel 104 to pickup the reel 104. Other types of end effectors may be used in alternative embodiments.

In an exemplary embodiment, the reel positioning device 206 includes an imaging device 250 for imaging the reel 104 and the environment around the reel. The imaging device 250 generates an image configured to be analyzed by the mobile reel transport device 200 to control operation of the mobile reel transport device 200. In various embodiments, the image may be transferred to the controller 220 (shown in FIG. 2) and analyzed by the controller 220, which controls operation of the reel manipulator 204 and the AGV 202 based on the image. In various embodiments, the imaging device 250 includes a camera 252 for imaging the reel 104. In an exemplary embodiment, the imaging device 250 is used to determine an orientation of the reel 104, such as to control operation of the end effector 232 to pickup the reel 104. For example, the movable component 230 may adjust an angular orientation of the end effector 232 based on the image of the reel 104 to properly align the end effector 232 with the reel 104 based on the orientation of the reel 104.

In an exemplary embodiment, the reel positioning device 206 includes a distance sensor 260 for terminating a distance between the end effector 232 and the reel 104. In various embodiments, the distance sensor 260 is a laser sensor configured to determine distance from the laser sensor to the reel 104 using a laser beam. A distance signal is transmitted from the distance sensor 262 the controller 220 to control operation of the reel manipulator 204 based on the distance signal.

Figure 5:
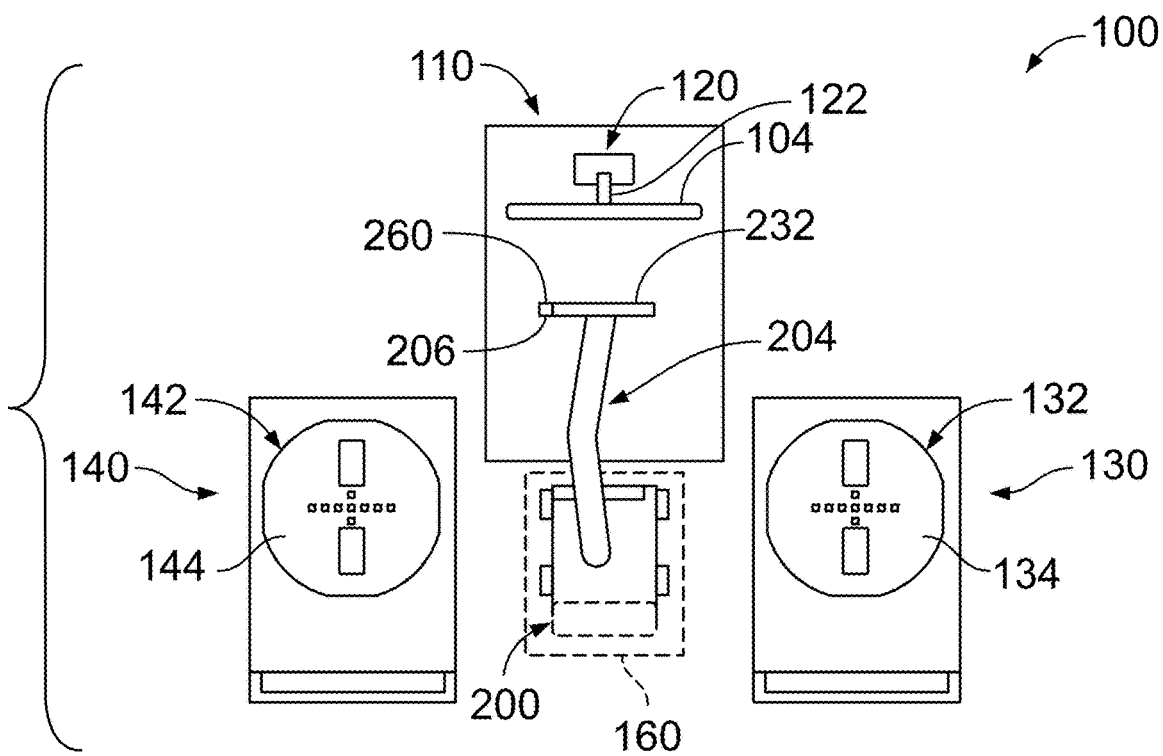
FIG. 5 illustrates the component reel packaging system in accordance with an exemplary embodiment showing the mobile reel transport device at the reel loading workstation.
Figure 6:
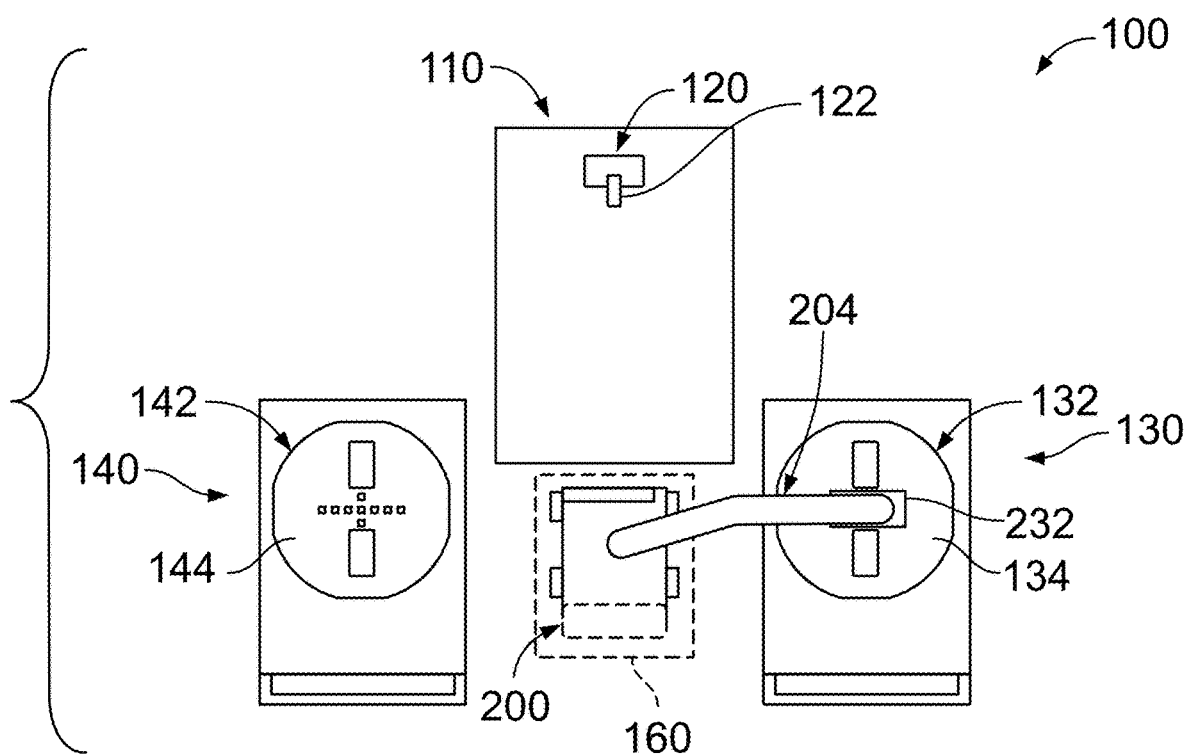
FIG. 6 illustrates the component reel packaging system in accordance with an exemplary embodiment showing the mobile reel transport device at the reel loading workstation interfacing with the empty reel rack.
Figure 7:
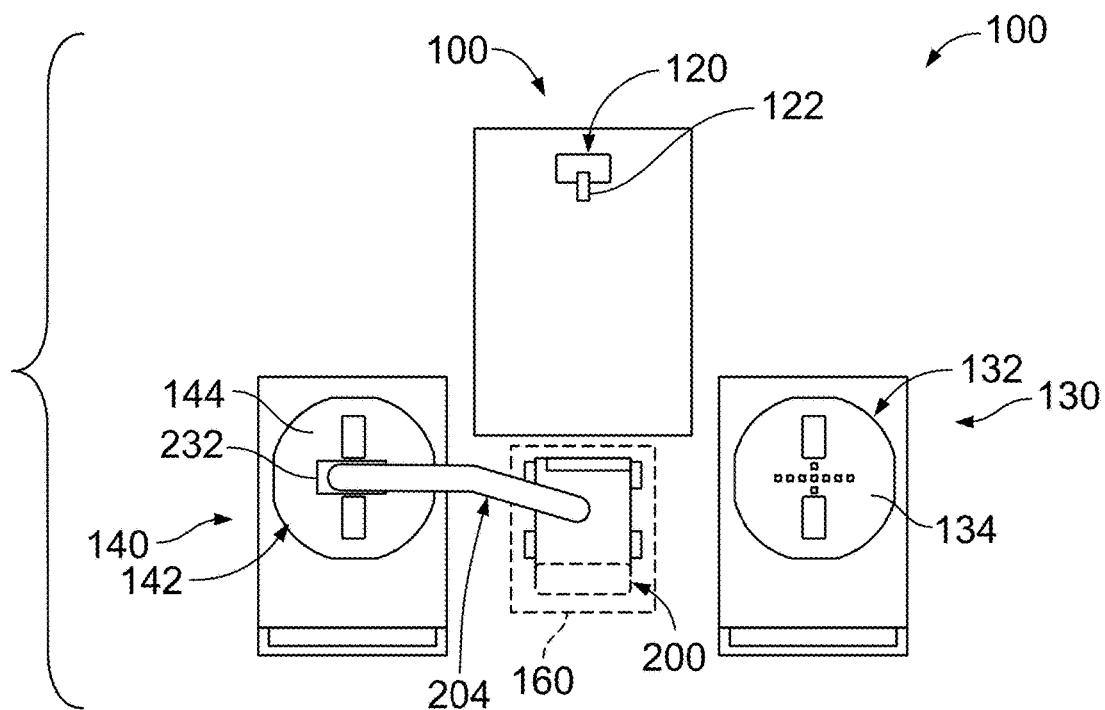
FIG. 7 illustrates the component reel packaging system in accordance with an exemplary embodiment showing the mobile reel transport device at the reel loading workstation interfacing with the full reel rack.

FIG. 5 illustrates the component reel packaging system 100 in accordance with an exemplary embodiment showing the mobile reel transport device 200 at the reel loading workstation 110. FIG. 6 illustrates the component reel packaging system 100 in accordance with an exemplary embodiment showing the mobile reel transport device 200 at the reel loading workstation 110 interfacing with the empty reel rack 130. FIG. 7 illustrates the component reel packaging system 100 in accordance with an exemplary embodiment showing the mobile reel transport device 200 at the reel loading workstation 110 interfacing with the full reel rack 140.

The mobile reel transport device 200 is used to transfer the empty reels 134 from the empty reel rack 130 to the reel support 120 of the reel loading workstation 110 where the components 102 may be loaded onto the reel 104. Once the reel 104 is loaded with the components 102, the mobile reel transport device 200 is used to transfer the full reel 144 from the reel support 120 of the reel loading workstation 110 to the full reel rack 140. In an exemplary embodiment, the mobile reel transport device 200 is able to stay at the parking spot 160 and interface with the empty reels 134 at the empty reel rack 130, the loaded reels 104 at the reel support 120 of the reel loading workstation 110, and the full reels 144 at the full reel rack 140. The movable component 230 has sufficient length to position the end effector 232 over the empty reel stack 132, to position the end effector 232 at the shaft 122 of the reel support 120, and to position the end effector 232 over the full reel stack 142.

During operation, when the reel loading workstation 110 is empty and needs the reel 104 for packaging the components 102, the reel loading workstation 110 wirelessly communicates with the mobile reel transport device 200 to maneuver to the parking spot 160. The mobile reel transport device 200 picks up one of the empty reels 134 from the empty reel stack 132 and moves the empty reel 134 onto the shaft 122 of the reel support 120. In an exemplary embodiment, the mobile reel transport device 200 positions the reel manipulator 204 and the reel position device 206 relative to the empty reel 134, such as directly above the empty reel 134, and images the empty reel 134. The image is analyzed by the mobile reel transport device 200 to determine the orientation of the empty reel 134. For example, the image is analyzed to determine a center of the empty reel 134, such as to locate the hub 106. The image is analyzed to determine an area of the empty reel 134 that the end effector 232 is able to interface with. For example, the image may be analyzed to determine where the large openings are located such that the end effector 232 may avoid the areas where the large openings are located. The reel manipulator 204 rotates the end effector 232 to an appropriate angular position to orient the end effector 232 relative to the empty reel 134. The end effector 232 lifts the empty reel 134 off of the empty reel stack 132 and moves the empty reel 134 into alignment with the shaft 122 of the reel support 120. The end effector 232 places the empty reel 134 on the shaft 122 and releases the empty reel 134. The empty reel 134 may then be loaded with the components 102.

During operation, when the reel loading workstation 110 reel 104 at the reel loading workstation 110 is full, and needs the loaded reel 104 removed and replaced with an empty reel, the reel loading workstation 110 wirelessly communicates with the mobile reel transport device 200 to maneuver to the parking spot 160 and unloading the loaded reel 104 from the reel support 120. In an exemplary embodiment, prior to picking up the loaded reel 104 from the reel support 120, the mobile reel transport device 200 positions the reel positioning device 206 over the full reel stack 142 and images the full reel stack 142. The image is analyzed to determine the angular orientation of the full reels 144 on the full reel stack 142 as such, the mobile reel transport device 200 may stack the loaded reel 104 on the full reel stack 142 in the same orientation as the other full reels 144 in the form reel stack 142. Once the orientation of the full reels 144 in the form reel stack 142 is determined, the reel manipulator 204 and reel position device 206 are moved into position at the loaded reel 104. The reel positioning device 206 images the loaded reel 104. The image is analyzed to determine the angular orientation of the loaded reel 104 on the shaft 122. The reel manipulator 204 rotates the end effector 232 to an appropriate angular position to orient the end effector 232 relative to the loaded reel 104. The distance sensor 260 may determine the distance between the end effector 232 and the loaded reel 104. The reel manipulator 204 than moves the end effector 232 to pick up the loaded reel 104 based on the measured distance by the distance sensor 260. The reel manipulator 204 removes the loaded reel 104 from the reel support 120 and positions the loaded reel above the full reel stack 142. The reel manipulator 204 may adjust the angular position of the loaded reel 104 to correspond with the determined angular orientations of the loaded reels 144 in the loaded reel stack 142, such as based on the image taken of the full reels 144 prior to picking up the loaded reel 104. The end effector 232 releases the loaded reel 104 in the form reel stack 142 and continues to perform another task, such as to pick up one of the empty reels 134 and load the empty reel 134 onto the reel support 120.

Figure 8:
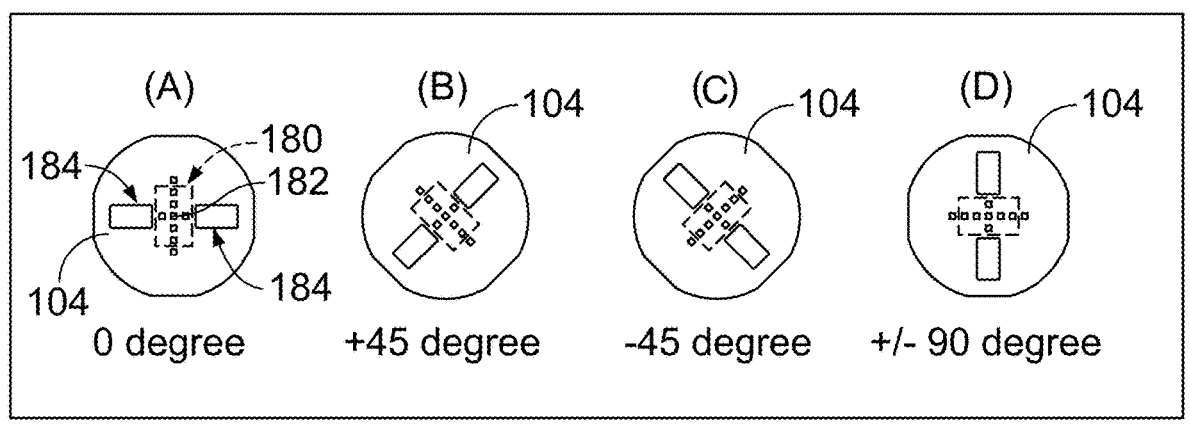
FIG. 8 illustrates the reels at various angular orientations in accordance with an exemplary embodiment.

FIG. 8 illustrates the reels 104 at various angular orientations. For example, the reel 104 at A is at a 0° orientation. The reel 104 at B is at a +45° orientation. The reel 104 C is at a −45° orientation. The reel 104 at D is at a +/−90° orientation. Other orientations are possible. In an exemplary embodiment, the end effector 232 is configured to pick up the reel 104 at a pickup location 180 generally arranged at a center 182 of the reel 104, which is located between the two large openings 184 through the reel 104. The pickup location 180 provides a large surface area for the end effector 232 to interface with. In an exemplary embodiment, the end effector 232 is capable of rotating 360° and thus may pick up the reel 104 at any angular orientation.

Figure 9:
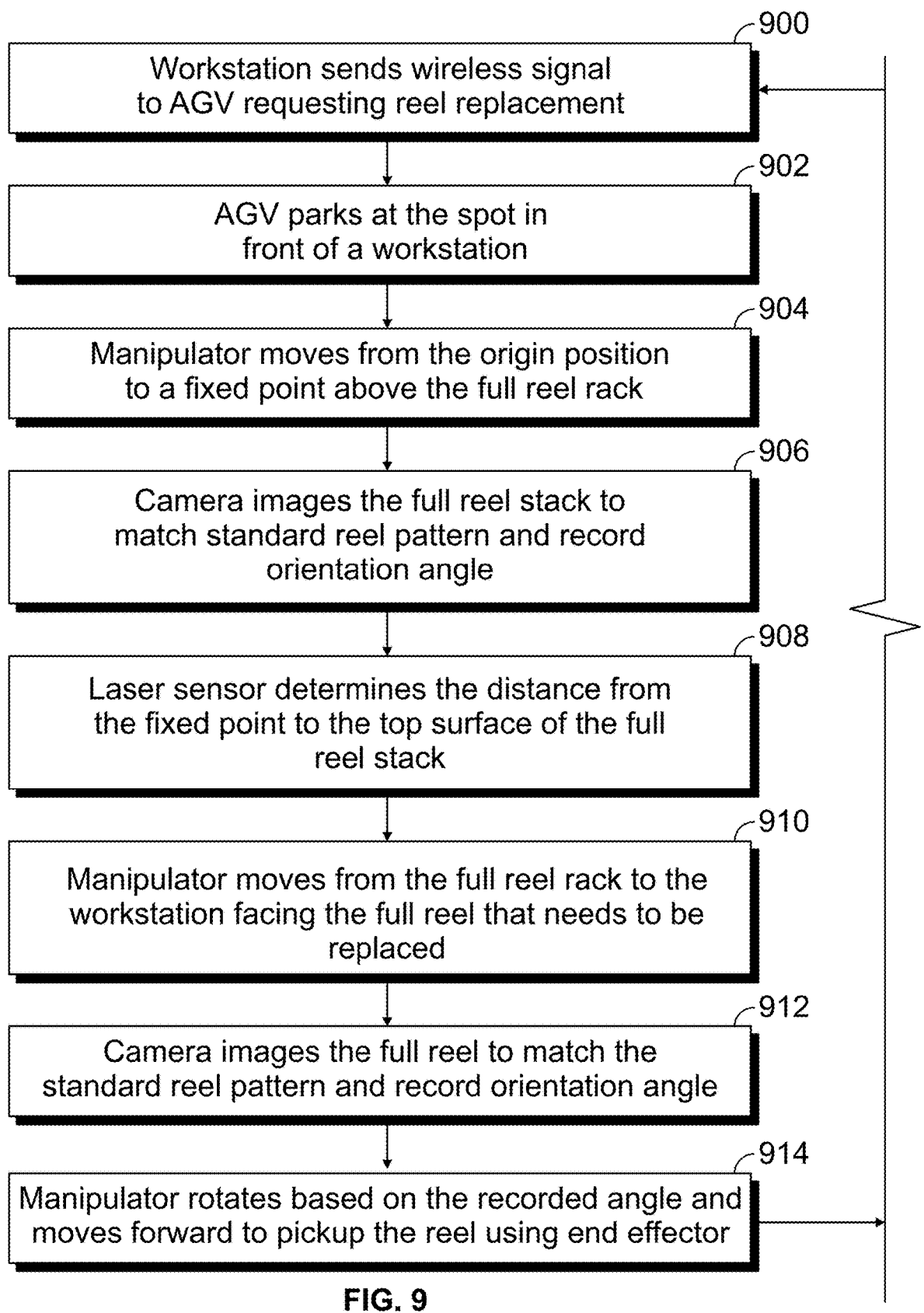
FIG. 9 is a flowchart showing an exemplary component reel packaging operation in accordance with an exemplary embodiment utilizing the mobile reel transport device (shown in FIG. 2).
Figure 9:
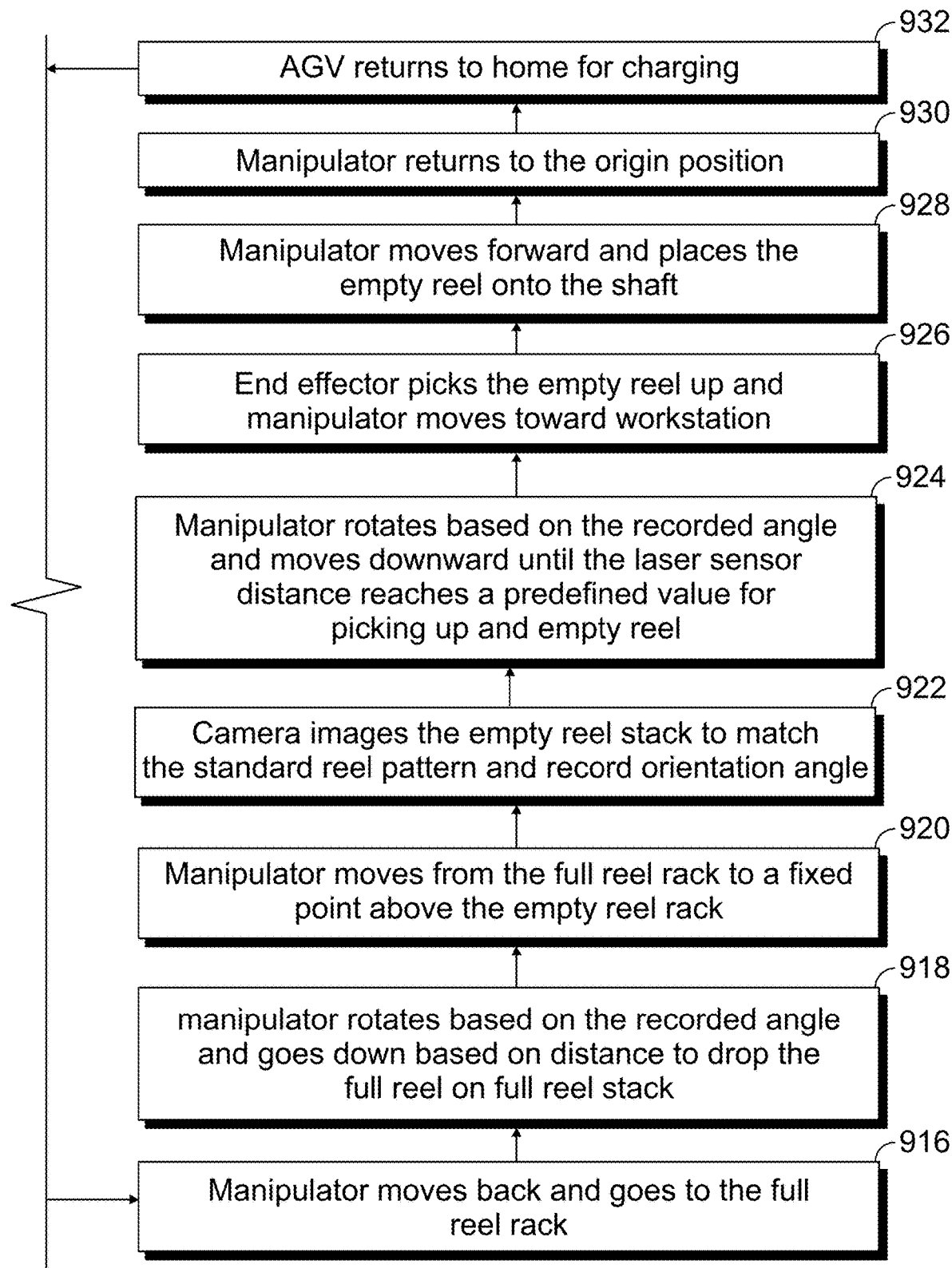

FIG. 9 is a flowchart showing an exemplary component reel packaging operation in accordance with an exemplary embodiment utilizing the mobile reel transport device 200 (shown in FIG. 2). Various steps in the process may be amended or other steps may be added in alternative embodiments. Additionally, the order of the steps in the process may be changed in alternative embodiments.

At 900, the workstation sends a wireless signal to the AGV requesting reel replacement. The wireless signal may be transmitted directly from the workstation or from a central distribution center. At 902, the AGV parks at a predetermined parking spot location in front of the workstation. For example, the AGV may be centered relative to the workstation. The AGV may be at a predetermined spacing or distance from the workstation. As such, the location of the reel manipulator of the mobile reel transport device is known relative to the location of the reel support of the reel loading workstation.

At 904, the reel manipulator moves from an origin or resting position to a fixed point above the full reel rack. For example, the imaging device of the reel position device may be located directly above the full reel rack to image the full reels in the full reel stack. The fixed point is known because the mobile reel transport device is at the known parking spot. At 906, the imaging device images the full reel stack to determine the angular orientation of the full reel at the top of the full reel stack. The mobile reel transport device may record the angular orientation for later use by the mobile reel transport device to place the full reel on the full reel stack at the same angular orientation as the other full reels on the full reel stack. At 908, the distance sensor determines the distance from the fixed point above the full reel stack to the top surface of the uppermost full reel in the full reel stack. The mobile reel transport device may record the distance for later use by the mobile reel transport device to place the full reel on the full reel stack.

At 910, the reel manipulator moves from the full reel rack to the workstation and faces the loaded reel at the reel support that needs to be replaced. The reel manipulator may move the end effector to a fixed position relative to the reel support 120. The fixed position is known because the mobile reel transport device is at the predetermined parking spot. At 912, the imaging device images the loaded reel to determine the angular orientation of the loaded reel on the reel support. At 914, the movable component of the reel manipulator rotates the end effector to a proper angular position that matches the angular orientation of the loaded reel and move the end effector forward to pick up the loaded reel. The angular position is determined based on analysis of the image of the loaded reel. Optionally, the distance sensor 260 may determine the distance to the loaded reel from the fixed position based on the distance measurement.

At 916, the reel manipulator moves the loaded reel back away from the reel support and moves the loaded reel to the full reel rack. At 918, the reel manipulator rotates the loaded reel to a particular angular position based on the recorded angle of the full reels in the full reel stack. The reel manipulator moves the loaded reel to the top of the full reel stack based on the recorded distance to the uppermost full reel. The end effector releases the loaded reel onto the full reel stack.

At 920, the reel manipulator moves from the full reel rack to a fixed point above the empty reel rack. The fixed point is known because the mobile reel transport device is at the predetermined parking spot. At the fixed point, the imaging device of the reel position device may be located directly above the empty reel rack to image the empty reels in the empty reel stack. At 922, the imaging device images the empty reel stack to determine the angular orientation of the uppermost empty reel on the empty reel stack. The mobile reel transport device may record the angular orientation. At 924, the reel manipulator rotates the end effector to a proper angular position that matches the angular orientation of the empty reel. The reel manipulator 204 may move the end effector downward toward the empty reel until the distance sensor reaches a defined value or distance relative to the empty reel for picking up the empty reel. At 926, the end effector picks up the empty reel and the movable component moves the empty reel toward the workstation. At 928, the reel manipulator moves to a fixed position relative to the reel support and places the empty reel onto the shaft of the reel support. The end effector releases the empty reel once the empty reel is on the reel support.

At 930, the reel manipulator returns to the origin are resting position on the AGV. At 932, the AGV returns to the docking station for charging or other workstation for performing other tasks.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

What is claimed is:

1. A mobile reel transport device comprising:
   an automated guided vehicle (AGV) having a mobile cart with wheels for maneuvering through a facility;
   a reel manipulator mounted to the mobile cart, the reel manipulator having a movable component movable relative to the mobile cart and an end effector at a distal end of the movable component, the end effector configured to pick up and manipulate a reel; and
   a reel positioning device at the distal end of the movable component, the reel positioning device including an imaging device for imaging the reel and environment and generating an image, the reel positioning device determining a position and an angular orientation of the reel based on the image;
   wherein the reel manipulator is operable to move the end effector based on the position and move a rotational orientation of the end effector based on the angular orientation of the reel determined based on the image.

2. The mobile reel transport device of claim 1, wherein the imaging device is a camera.

3. The mobile reel transport device of claim 1, wherein the reel positioning device includes a controller analyzing the image to determine the angular orientation of the reel, the controller controlling an angular position of the end effector based on the determined angular orientation of the reel from the image analysis.

4. The mobile reel transport device of claim 1, wherein the movable component is capable of changing an angular orientation of the end effector to orient the end effector relative to the reel.

5. The mobile reel transport device of claim 1, wherein the movable component is capable of moving the end effector in three-dimensional space.

6. The mobile reel transport device of claim 1, wherein the movable component includes a multi-axis robot arm.

7. The mobile reel transport device of claim 1, wherein the reel positioning device includes a distance sensor configured to detect a distance from the end effector to the reel.

8. The mobile reel transport device of claim 7, wherein the distance sensor is a laser sensor.

9. The mobile reel transport device of claim 1, wherein the AGV includes a communication module configured to wirelessly communicate with a call center to control operation of the AGV.

10. A component reel packaging system for loading components on reels, the component reel packaging system comprising:
    a reel loading workstation having a reel support;
    a mobile reel transport device movable relative to the reel loading workstation, the mobile reel transport device including an automated guided vehicle (AGV) having a mobile cart with wheels for maneuvering the mobile reel transport device relative to the reel loading workstation, the mobile reel transport device including a reel manipulator mounted to the mobile cart having a movable component movable relative to the mobile cart and an end effector at a distal end of the movable component configured to pick up and manipulate a reel, and the mobile reel transport device including a reel positioning device at the distal end of the movable component having an imaging device for imaging the reel and environment and generating an image, the reel positioning device determining a position and an angular orientation of the reel based on the image, the reel manipulator being operable to move the end effector based on the position and move a rotational orientation of the end effector based on the angular orientation of the reel determined based on the image;
    wherein the reel positioning device is configured to pick up an empty reel and place the empty reel on the reel support;
    wherein the empty reel is configured to be loaded with components at the reel loading workstation; and wherein the reel positioning device is configured to pick up the full reel loaded with components and move the full reel away from the reel support.

11. The component reel packaging system of claim 10, wherein the reel support includes a shaft configured to rotatably receive the reel.

12. The component reel packaging system of claim 10, wherein the reel loading workstation includes a parking spot, the mobile reel transport device is movable into and out of the parking spot, the reel manipulator being located at a known, predetermined position relative to the reel support when the mobile transport device is at the parking spot.

13. The component reel packaging system of claim 10, wherein the reel positioning device includes a controller analyzing the image to determine the angular orientation of the reel, the controller controlling an angular position of the end effector based on the determined angular orientation of the reel from the image analysis.

14. The component reel packaging system of claim 10, wherein the movable component is capable of changing an angular orientation of the end effector to orient the end effector relative to the reel.

15. The component reel packaging system of claim 10, wherein the reel positioning device includes a distance sensor configured to detect a distance from the end effector to the reel.

16. A component reel packaging system for loading components on reels, the component reel packaging system comprising:
an empty reel rack configured to hold an empty reel stack of empty reels;
a full reel rack configured to hold a full reel stack of full reels;
a reel loading workstation near the empty reel rack and the full reel rack, the reel loading workstation having a reel support configured to support a reel for loading components on the reel;
a mobile reel transport device movable relative to the empty reel rack, the full reel rack, and the reel loading workstation, the mobile reel transport device including an automated guided vehicle (AGV) having a mobile cart with wheels for maneuvering the mobile reel transport device, the mobile reel transport device including a reel manipulator mounted to the mobile cart having a movable component movable relative to the mobile cart and an end effector at a distal end of the movable component configured to pick up and manipulate a reel, and the mobile reel transport device including a reel positioning device at the distal end of the movable component having an imaging device for imaging the reel and environment and generating an image, the reel positioning device determining a position and an angular orientation of the reel based on the image, the reel manipulator being operable to move the end effector based on the position and move a rotational orientation of the end effector based on the angular orientation of the reel determined based on the image;
wherein the reel positioning device is configured to pick up an empty reel from the empty reel stack at the empty reel rack and place the empty reel on the reel support;
wherein the empty reel is configured to be loaded with components at the reel loading workstation; and
wherein the reel positioning device is configured to pick up the full reel loaded with components and move the full reel from the reel support to the full reel stack at the full reel rack.

17. The component reel packaging system of claim 16, wherein the reel positioning device determines an angular orientation of the empty reel from the image by the imaging device prior to pick up of the empty reel and controls an angular orientation of the end effector based on the determined angular orientation of the empty reel, and wherein the reel positioning device determines an angular orientation of the loaded reel on the reel support from the image by the imaging device prior to pick up of the loaded reel and controls an angular orientation of the end effector based on the determined angular orientation of the loaded reel.

18. The component reel packaging system of claim 17, wherein the reel positioning device determines an angular orientation of the full reels in the full reel stack from the image by the imaging device prior to pick up of the loaded reel from the reel support, the reel positioning device controlling an angular orientation of the end effector based on the determined angular orientation of the full reels in the full reel stack to stack the loaded reel on the full reel stack in the same orientation.

19. The component reel packaging system of claim 16, wherein the mobile transport device is movable away from the reel loading workstation to a second reel loading workstation.

20. The component reel packaging system of claim 16, wherein the mobile transport device is movable away from the reel loading workstation to a docking station, the mobile transport device being called by a wireless call signal from the reel loading workstation when the reel at the reel support is loaded.

* * * * *